US012112381B2

(12) United States Patent
Chen et al.

(10) Patent No.: US 12,112,381 B2
(45) Date of Patent: Oct. 8, 2024

(54) ANALYSIS METHOD AND ANALYSIS SYSTEM OF FINANCIAL SECURITIES PRODUCT VALUE MODEL BASED ON ARTIFICIAL INTELLIGENCE AND NON-TRANSITORY COMPUTER READABLE RECORDING MEDIUM

(71) Applicant: NATIONAL CHIN-YI UNIVERSITY OF TECHNOLOGY, Taichung (TW)

(72) Inventors: Chi-Tung Chen, Taichung (TW); Wei-Jie Han, Taichung (TW)

(73) Assignee: NATIONAL CHIN-YI UNIVERSITY OF TECHNOLOGY, Taichung (TW)

( * ) Notice: Subject to any disclaimer, the term of this patent is extended or adjusted under 35 U.S.C. 154(b) by 84 days.

(21) Appl. No.: 18/058,275

(22) Filed: Nov. 23, 2022

(65) Prior Publication Data

US 2023/0394581 A1 Dec. 7, 2023

(30) Foreign Application Priority Data

Jun. 7, 2022 (TW) .................................. 111121090

(51) Int. Cl.
*G06Q 40/06* (2012.01)
*G06Q 40/04* (2012.01)

(52) U.S. Cl.
CPC ............. *G06Q 40/06* (2013.01); *G06Q 40/04* (2013.01)

(58) Field of Classification Search
None
See application file for complete search history.

(56) References Cited

U.S. PATENT DOCUMENTS

| | | | |
|---|---|---|---|
| 6,564,191 B1* | 5/2003 | Reddy | G06Q 40/06 705/36 R |
| 2006/0277124 A1* | 12/2006 | Gerrietts, II | G06Q 40/06 705/35 |
| 2009/0018891 A1* | 1/2009 | Eder | G06Q 10/0635 705/7.29 |

(Continued)

OTHER PUBLICATIONS

C. Zhou, "Quantitative Investment Strategy Analysis based on Machine Learning for Share Dealing," 2020 7th International Conference on Information Science and Control Engineering (ICISCE), Changsha, China, 2020, pp. 1051-1057. (Year: 2020).*

*Primary Examiner* — Elizabeth H Rosen
(74) *Attorney, Agent, or Firm* — CKC & Partners Co., LLC

(57) ABSTRACT

An analysis method of a financial securities product value model based on artificial intelligence includes performing a determining step, a data acquiring step, an analyzing step and a strategy generating step. The determining step is performed to determine that the customer is one of a long-term investing customer and a short-term investing customer. The data acquiring step is performed to acquire one of a plurality of long-term trading parameters and a short-term trading data. The analyzing step includes dividing the financial securities products into a plurality of groups, and calculate a plurality of classify conditions and analyzing a product relevance and a purchasing sequence of the financial securities products. The strategy generating step is performed to generate a purchasing strategy according to the groups, the classify conditions, the importance value of each of the long-term trading parameters, the product relevance and the purchasing sequence.

10 Claims, 5 Drawing Sheets

(56) References Cited

U.S. PATENT DOCUMENTS

| | | | | |
|---|---|---|---|---|
| 2013/0173900 A1* | 7/2013 | Liu | ................ | G06F 9/45558 |
| | | | | 713/2 |
| 2016/0350857 A1* | 12/2016 | Dintenfass | ............ | G06Q 40/06 |
| 2020/0202436 A1* | 6/2020 | Krishnan | ............... | G06N 3/045 |

* cited by examiner

ANALYSIS METHOD AND ANALYSIS SYSTEM OF FINANCIAL SECURITIES PRODUCT VALUE MODEL BASED ON ARTIFICIAL INTELLIGENCE AND NON-TRANSITORY COMPUTER READABLE RECORDING MEDIUM

RELATED APPLICATIONS

This application claims priority to Taiwan Application Serial Number 111121090, filed Jun. 7, 2022, which is herein incorporated by reference.

BACKGROUND

Technical Field

The present disclosure relates to an analysis method and an analysis system of a product value model based on artificial intelligence and a computer readable recording medium. More particularly, the present disclosure relates to an analysis method and an analysis system of financial securities product value model based on artificial intelligence and a computer readable recording medium.

Description of Related Art

The conventional investment predicting system predicts the raising price in the future, the return on investment (ROI) of the financial securities products via the historical data of each of the financial securities products. However, most of the investment prediction results are substantially different from the actual situation, and the investment prediction results are unreliable to the consumer.

Therefore, an analysis method and an analysis system of financial securities product value model based on artificial intelligence and a computer readable recording medium which can generate purchasing strategies by different predicting methods based on the investing characteristic of specific consumers are commercially desirable.

SUMMARY

According to one aspect of the present disclosure, an analysis method of a financial securities product value model based on artificial intelligence is configured to predict a purchasing strategy of a customer while the customer purchases a plurality of financial securities products. The analysis method of the financial securities product value model based on artificial intelligence includes performing a determining step, a data acquiring step, an analyzing step and a strategy generating step. The determining step includes configuring a processor to determine that the customer is one of a long-term investing customer and a short-term investing customer. The data acquiring step includes configuring the processor to acquire one of a plurality of long-term trading parameters and a short-term trading data of each of the financial securities products from a cloud server according to the one of the long-term investing customer and the short-term investing customer. The long-term trading parameters and the short-term trading data are corresponding to the long-term investing customer and the short-term investing customer, respectively. The analyzing step includes performing one of a long-term strategy analyzing step and a short-term strategy analyzing step according to the one of the long-term investing customer and the short-term investing customer. The long-term strategy analyzing step is performed to configure the processor to divide the financial securities products into a plurality of groups, and calculate a plurality of classify conditions corresponding to the groups and an importance value of each of the long-term trading parameters. The short-term strategy analyzing step is performed to configure the processor to analyze a product relevance and a purchasing sequence of the financial securities products. The strategy generating step includes configuring the processor to generate the purchasing strategy according to the groups, the classify conditions, the importance value of each of the long-term trading parameters, the product relevance and the purchasing sequence. In response to determining that the customer is determined as the long-term investing customer, the processor is configured to perform the long-term strategy analyzing step. In response to determining that the customer is determined as the short-term investing customer, the processor is configured to perform the short-term strategy analyzing step.

According to another aspect of the present disclosure, an analysis system of a financial securities product value model based on artificial intelligence is configured to predict a purchasing strategy of a customer while the customer purchases a plurality of financial securities products. The analysis system of the financial securities product value model based on artificial intelligence includes a cloud server and a processor. The cloud server includes a plurality of long-term trading parameters and a short-term trading data of each of the financial securities products. The processor is signally connected to the cloud server, and configured to perform an analysis method of the financial securities product value model based on artificial intelligence. The analysis method of the financial securities product value model based on artificial intelligence includes performing a determining step, a data acquiring step, an analyzing step and a strategy generating step. The determining step includes determining that the customer is one of a long-term investing customer and a short-term investing customer. The data acquiring step includes acquiring one of the long-term trading parameters and the short-term trading data of each of the financial securities products from the cloud server according to the one of the long-term investing customer and the short-term investing customer. The long-term trading parameters and the short-term trading data are corresponding to the long-term investing customer and the short-term investing customer, respectively. The analyzing step includes performing one of a long-term strategy analyzing step and a short-term strategy analyzing step according to the one of the long-term investing customer and the short-term investing customer. The long-term strategy analyzing step is performed to divide the financial securities products into a plurality of groups, and calculate a plurality of classify conditions corresponding to the groups and an importance value of each of the long-term trading parameters. The short-term strategy analyzing step is performed to analyze a product relevance and a purchasing sequence of the financial securities products. The strategy generating step includes generating the purchasing strategy according to the groups, the classify conditions, the importance value of each of the long-term trading parameters, the product relevance and the purchasing sequence. In response to determining that the customer is determined as the long-term investing customer, the processor is configured to perform the long-term strategy analyzing step. In response to determining that the customer is determined as the short-term investing customer, the processor is configured to perform the short-term strategy analyzing step.

According to further another aspect of the present disclosure, a computer readable recording medium includes a program for a processor capable of predicting a purchasing strategy of a customer while the customer purchases a plurality of financial securities products, to execute an analysis method of a financial securities product value model based on artificial intelligence. The analysis method of the financial securities product value model based on artificial intelligence includes performing a determining step, a data acquiring step, an analyzing step and a strategy generating step. The determining step includes configuring the processor to determine that the customer is one of a long-term investing customer and a short-term investing customer. The data acquiring step includes configuring the processor to acquire one of a plurality of long-term trading parameters and a short-term trading data of each of the financial securities products from a cloud server according to the one of the long-term investing customer and the short-term investing customer. The long-term trading parameters and the short-term trading data are corresponding to the long-term investing customer and the short-term investing customer, respectively. The analyzing step includes performing one of a long-term strategy analyzing step and a short-term strategy analyzing step according to the one of the long-term investing customer and the short-term investing customer. The long-term strategy analyzing step is performed to configure the processor to divide the financial securities products into a plurality of groups, and calculate a plurality of classify conditions corresponding to the groups and an importance value of each of the long-term trading parameters. The short-term strategy analyzing step is performed to configure the processor to analyze a product relevance and a purchasing sequence of the financial securities products. The strategy generating step includes configuring the processor to generate the purchasing strategy according to the groups, the classify conditions, the importance value of each of the long-term trading parameters, the product relevance and the purchasing sequence. In response to determining that the customer is determined as the long-term investing customer, the processor is configured to perform the long-term strategy analyzing step. In response to determining that the customer is determined as the short-term investing customer, the processor is configured to perform the short-term strategy analyzing step.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
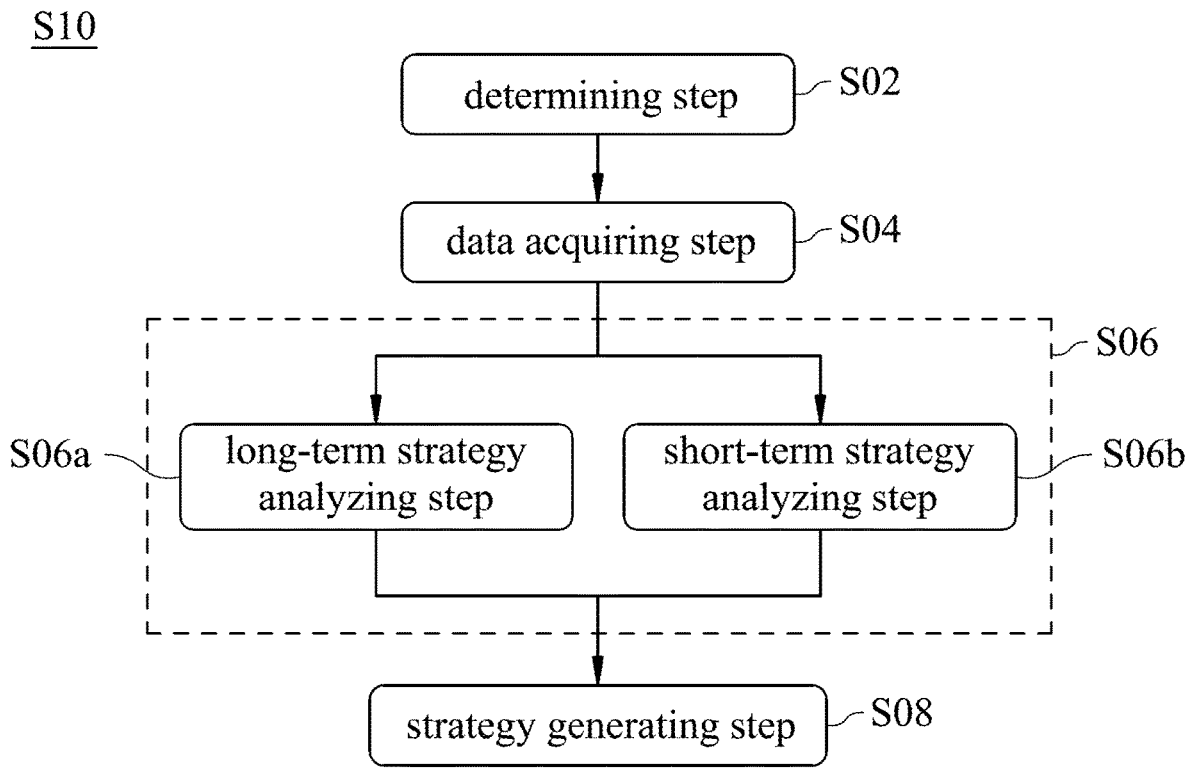
FIG. 1 shows a flow chart of an analysis method of a financial securities product value model based on artificial intelligence according to a first embodiment of the present disclosure.

Please refer to FIG. 1. FIG. 1 shows a flow chart of an analysis method S10 of a financial securities product value model based on artificial intelligence according to a first embodiment of the present disclosure. The analysis method S10 of the financial securities product value model based on artificial intelligence is configured to predict a purchasing strategy of a customer while the customer purchases a plurality of financial securities products 10 (shown in FIG. 3). The analysis method S10 of the financial securities product value model based on artificial intelligence includes performing a determining step S02, a data acquiring step S04, an analyzing step S06 and a strategy generating step S08. The determining step S02 includes configuring a processor 110 (shown in FIG. 3) to determine that the customer is one of a long-term investing customer and a short-term investing customer. The data acquiring step S04 includes configuring the processor 110 to acquire one of a plurality of long-term trading parameters 121 (shown in FIG. 3) and a short-term trading data 122 (shown in FIG. 3) of each of the financial securities products 10 from a cloud server 120 (shown in FIG. 3) according to the one of the long-term investing customer and the short-term investing customer. The long-term trading parameters 121 and the short-term trading data 122 are corresponding to the long-term investing customer and the short-term investing customer, respectively. The analyzing step S06 includes performing one of a long-term strategy analyzing step S06a and a short-term strategy analyzing step S06b according to the one of the long-term investing customer and the short-term investing customer. The long-term strategy analyzing step S06a is performed to configure the processor 110 to divide the financial securities products 10 into a plurality of groups, and calculate a plurality of classify conditions corresponding to the groups and an importance value of each of the long-term trading parameters 121. The short-term strategy analyzing step S06b is performed to configure the processor 110 to analyze a product relevance and a purchasing sequence of the financial securities products 10. The strategy generating step S08 includes configuring the processor 110 to generate the purchasing strategy according to the groups, the classify conditions, the importance value of each of the long-term trading parameters 121, the product relevance and the purchasing sequence. In response to determining that the customer is determined as the long-term investing customer, the processor 110 is configured to perform the long-term strategy analyzing step S06a. In response to determining that the customer is determined as the short-term investing customer, the processor 110 is configured to perform the short-term strategy analyzing step S06b.

In the determining step S02, the processor 110 is configured to acquire the historical transaction detail of the customer, and determines the customer as one of the long-term investing customer and the short-term investing customer according to a time interval between a purchasing time and a selling time. The purchasing time represents a time point of the customer purchases a financial securities product 10. The selling time represents a time point of the customer sells the aforementioned financial securities product 10. According to the first embodiment, when the time interval between the purchasing time and the selling time of a same financial securities product 10 is more than or equal to 6 months, the determining step S02 is performed to determine the customer as the long-term investing customer, when the time interval between the purchasing time and the selling time of a same financial securities product 10 is shorter than 6 months, the determining step S02 is performed to determine the customer as the short-term investing customer, but the present disclosure is not limited thereto.

Moreover, when the customer is determined as the long-term investing customer, the data acquiring step S04 is performed to configure the processor 110 to acquire the long-term trading parameters 121 of each of the financial securities products 10 from the cloud server 120. The long-term trading parameters 121 can include a beta factor $\beta$, a debt/equity ratio (D/E), a return on equity (ROE), a price-book ratio (P/B), a revenue growth rate, a market value, a turnover rate, a trading volume, a stock price and a momentum. The long-term trading parameters 121 corresponding to each of the financial securities products 10 are listed in Table 1. The product number is a number corresponds to each of the financial securities products 10. When the customer is determined as the short-term investing customer, the data acquiring step S04 is performed to configure the processor 110 to acquire the short-term trading data 122 from the cloud server 120. According to the first embodiment, the short-term trading data 122 can be a transaction detail of a financial securities product 10 in 5 weekdays, but the present disclosure is not limited thereto.

TABLE 1

| product number | 1 | 2 | 3 | 4 |
| --- | --- | --- | --- | --- |
| beta factor | 0.31 | 0.45 | 0.57 | 1.1 |
| debt/equity ratio | 27.09 | 26.62 | 415.4 | 80.79 |
| return on equity | 5.72 | 4.77 | −43.64 | 0.47 |
| price-book ratio | 0.95 | 0.74 | 1.16 | 0.99 |
| revenue growth rate | 8.56 | 2.74 | 14.65 | −8.01 |
| market value | 22.31 | 132.42 | 10.69 | 248.52 |
| turnover rate | 41.56 | 6.53 | 136.19 | 119.42 |
| trading volume | 73595 | 26233 | 102144 | 1978608 |
| stock price | 12.6 | 32.95 | 14.25 | 15 |
| momentum | 9.14 | 16.1 | 85.08 | 42.12 |

Thus, the analysis method S10 of the financial securities product value model based on artificial intelligence of the present disclosure can provide purchasing strategies corresponding to different customers by collecting the transaction detail according to whether the investing characteristic of each of the customer is long-term investing or short-term investing. The long-term strategy analyzing step S06a and the short-term strategy analyzing step S06b are described in more detail below.

Figure 2:
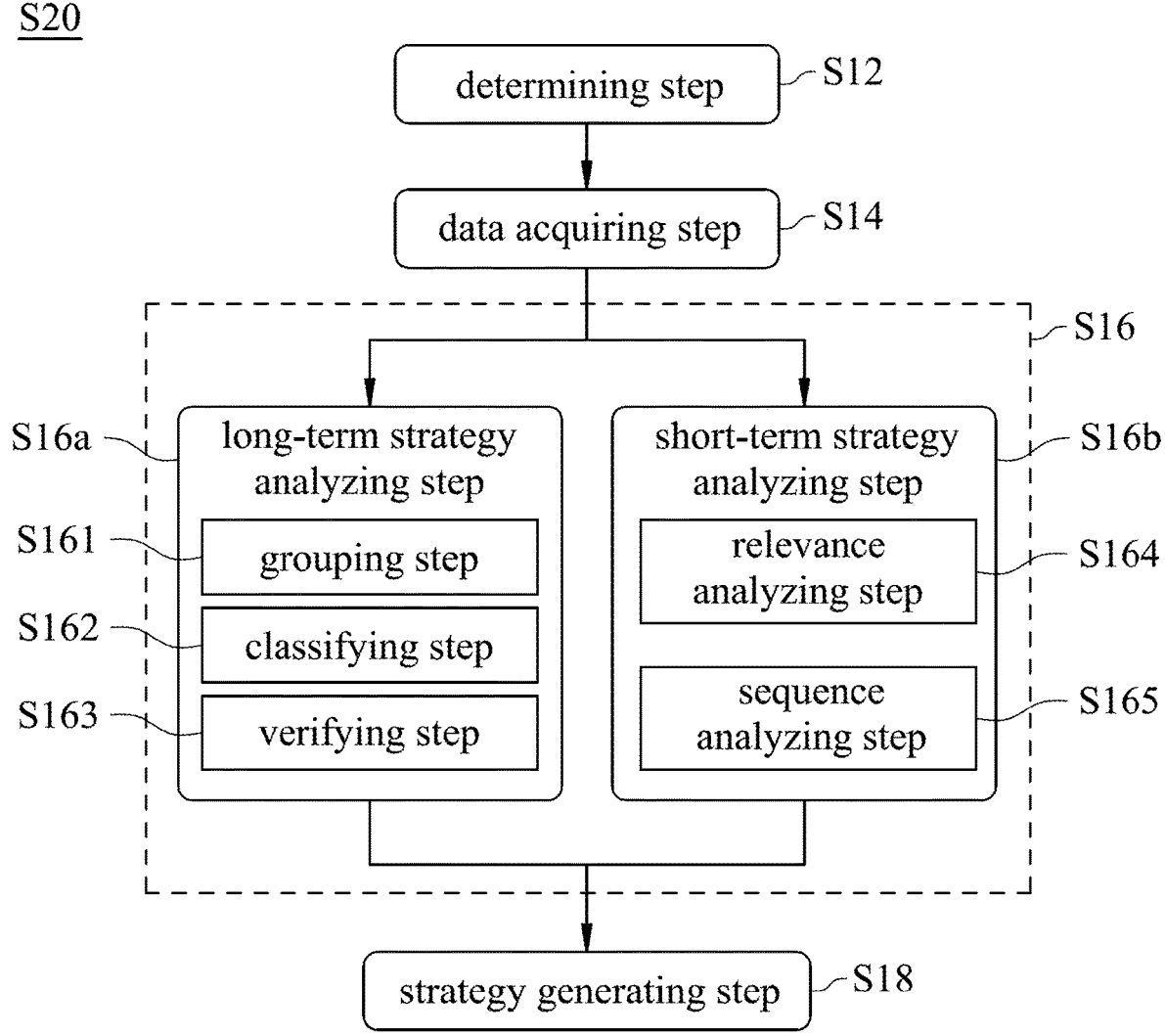
FIG. 2 shows a flow chart of an analysis method of a financial securities product value model based on artificial intelligence according to a second embodiment of the present disclosure.

Please refer to FIG. 1 and FIG. 2. FIG. 2 shows a flow chart of an analysis method S20 of a financial securities product value model based on artificial intelligence according to a second embodiment of the present disclosure. The analysis method S20 of the financial securities product value model based on artificial intelligence includes performing a determining step S12, a data acquiring step S14, an analyzing step S16 and a strategy generating step S18. The analyzing step S16 includes performing one of a long-term strategy analyzing step S16a and a short-term strategy analyzing step S16b. In the second embodiment, each of the determining step S12 and the data acquiring step S14 of the analysis method S20 of the financial securities product value model based on artificial intelligence are the same as each of the determining step S02 and the data acquiring step S04 of the analysis method S10 of the financial securities product value model based on artificial intelligence, and will not be described again herein. Furthermore, the long-term strategy analyzing step S16a can include performing a grouping step S161, a classifying step S162 and a verifying step S163. The short-term strategy analyzing step S16b can include performing a relevance analyzing step S164 and a sequence analyzing step S165.

Figure 3:
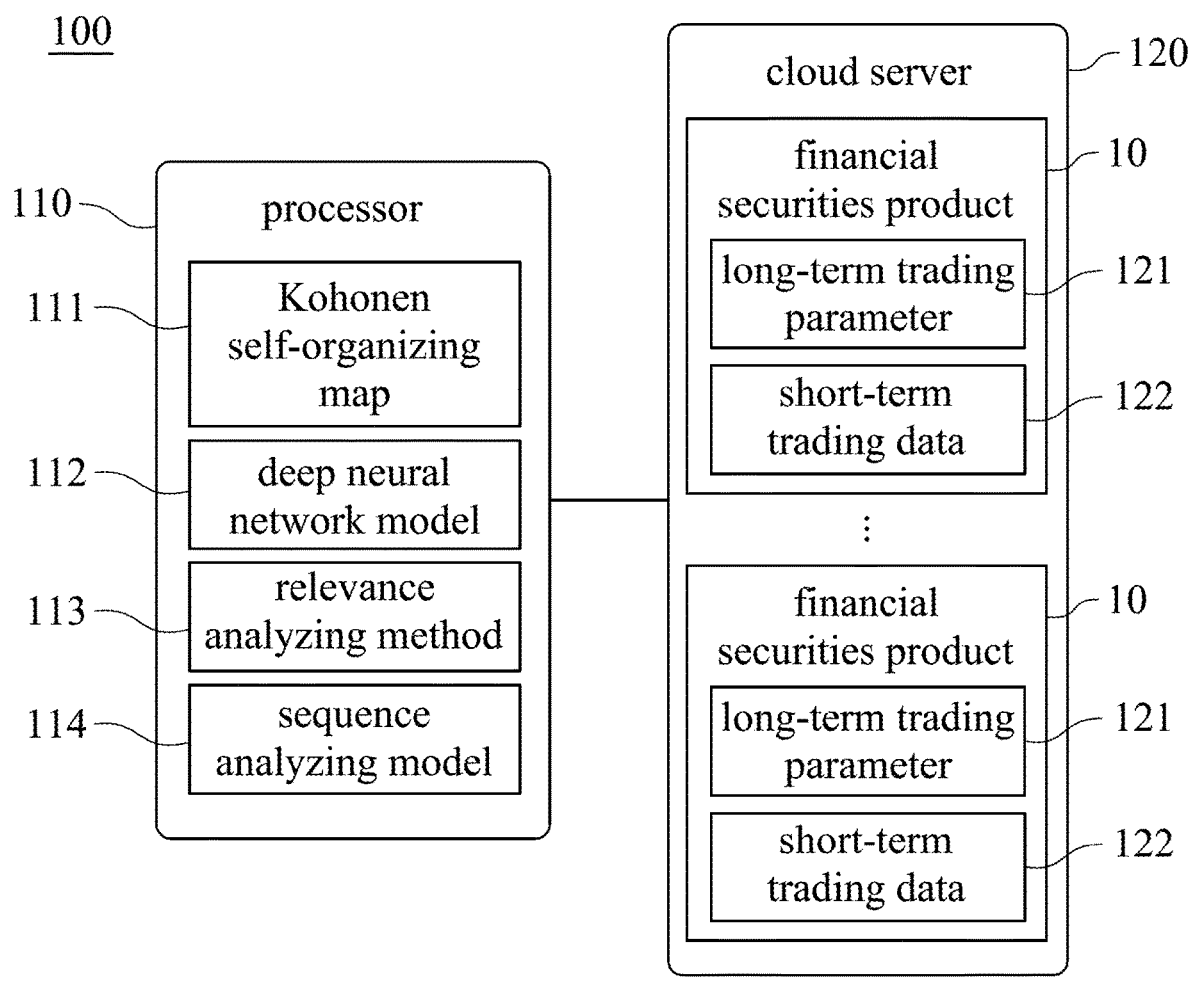
FIG. 3 shows a block diagram of an analysis system of a financial securities product value model based on artificial intelligence according to a third embodiment of the present disclosure.

The grouping step S161 includes configuring the processor 110 to divide the financial securities products 10 into the groups according to a Kohonen self-organizing map 111 (shown in FIG. 3). The groups include a high return rate group, a medium return rate group and a low return rate group. In the grouping step S161, the long-term trading parameters 121 of each of the financial securities products 10 are analyzed by the Kohonen self-organizing map 111, and the financial securities products 10 are divided into three groups (i.e., the high return rate group, the medium return rate group and the low return rate group).

The classifying step S162 includes configuring the processor 110 to classify the high return rate group, the medium return rate group and the low return rate group to generate the classify conditions according to the long-term trading parameters 121 of the financial securities products 10. In the classifying step S162, the long-term trading parameters 121 of the financial securities products 10, which are divided into the high return rate group, the medium return rate group and the low return rate group, are derived according to a classification and regression tree (CART) rule to generate the classify conditions of the high return rate group, the medium return rate group and the low return rate group. The classify conditions of the high return rate group, the medium return rate group and the low return rate group can be listed in Table 2. For instance, when the values of the long-term trading parameters 121 of one of the financial securities products 10 satisfy one of the classify conditions, the one of the financial securities products 10 can be predicted as one of the high return rate group, the medium return rate group and the low return rate group directly. $\beta$ represents the beta factor, and MOM represents the momentum.

TABLE 2

| classify conditions | group |
| --- | --- |
| $0.655 < \beta \leq 0.872$ | high return rate group |
| $MOM \leq 27.7$ | high return rate group |
| $0.875 < \beta$ | medium return rate group |

TABLE 2-continued

| classify conditions | group |
|---|---|
| β ≤ 0.872 | low return rate group |
| turnover rate ≤ 139.62 | low return rate group |

The verifying step S163 includes configuring the processor 110 to verify the importance value of each of the long-term trading parameters 121 according to a deep neural network (DNN) model 112 (shown in FIG. 3). In the verifying step S163, the long-term trading parameters 121 of the financial securities products 10, which are corresponding to the high return rate group, the medium return rate group and the low return rate group, are analyzed by the deep neural network model 112 to verify the importance value of each of the financial securities products 10. The importance value represents importance of each of the long-term trading parameters 121 to the grouping result of the grouping step S161. The importance value of each of the long-term trading parameters 121 in the second embodiment can be listed in Table 3. Thus, the analysis method S20 of the financial securities product value model based on artificial intelligence of the present disclosure can cluster the financial securities products 10 into the groups according to the long-term trading parameters 121 of the financial securities products 10, thereby providing a specific purchasing strategy to a specific customer by the investing characteristic thereof.

TABLE 3

| long-term trading parameters | importance value |
|---|---|
| beta factor | 0.21 |
| turnover rate | 0.16 |
| momentum | 0.15 |
| trading volume | 0.12 |
| stock price | 0.03 |
| P/B | 0.03 |
| ROE | 0.01 |
| return of investment | 0.01 |

The relevance analyzing step S164 includes configuring the processor 110 to analyze the product relevance of the financial securities products 10 according to a relevance analyzing method 113 (shown in FIG. 3). In the relevance analyzing step S164, a probability of each two of the financial securities products 10 are bought at the same time is calculated by the relevance analyzing method 113. The calculating result of the relevance analyzing method 113 is listed in Table 4. The antecedent represents a financial securities product 10, which is bought at first, the consequent represents a financial securities product 10, which is bought after the antecedent, the support represents a probability of the antecedent and the consequent are bought at the same time, and the confidence represents a probability of the consequent is bought when the antecedent has been bought. In Table 4, the confidence of the financial securities product A and the financial securities product B are bought is 66.67%.

TABLE 4

| antecedent | consequent | support | confidence |
|---|---|---|---|
| A | B | 0.1 | 66.67 |
| C | D | 0.065 | 50 |
| C | E | 0.066 | 50 |

TABLE 4-continued

| antecedent | consequent | support | confidence |
|---|---|---|---|
| F | D | 0.066 | 50 |
| F | G | 0.066 | 50 |

The sequence analyzing step S165 includes configuring the processor 110 to analyze the purchasing sequence of the financial securities products 10 according to a sequence analyzing model 114 (shown in FIG. 3). The sequence analyzing model 114 is configured to analyze the purchasing sequence of the financial securities products 10. Please refer to Table 5, Table 5 lists the purchasing sequence between the financial securities product A and the financial securities products B, C, D and E. In Table 5, a probability of a customer buys the financial securities product A after buying the financial securities product B is 96.8%, and a probability of a customer buys the financial securities product A after buying the financial securities product C is 83.3%.

TABLE 5

| product number | confidence |
|---|---|
| B | 96.8% |
| C | 83.3% |
| D | 64.7% |
| E | 52.94% |

When the customer is determined as the long-term investing customer, the strategy generating step S18 is performed to generate a purchasing strategy according to the groups, the classify conditions, the importance value of each of the long-term trading parameters 121. The groups, the classify conditions, the importance value of each of the long-term trading parameters 121 are calculated by the grouping step S161, the classifying step S162 and the verifying step S163. For example, in the strategy generating step 518, the long-term trading parameters 121 of a financial securities product 10, which was bought by a customer, are filled into the classify conditions, and the investing characteristic of the customer is determined as purchasing high risk and high ROE financial securities product 10 or purchasing low risk and low ROE financial securities product 10 according to the classify conditions of the aforementioned financial securities product 10, thereby a financial securities product 10 in the same group with the aforementioned financial securities product 10 will be recommended to the customer.

When the customer is determined as the short-term investing customer, the strategy generating step S18 is performed to generate a purchasing strategy according to the product relevance and the purchasing sequence. The product relevance and the purchasing sequence are calculated by the relevance analyzing step S164 and the sequence analyzing step S165. In detail, when two financial securities products 10, which are analyzed by the relevance analyzing step S164 and the sequence analyzing step S165, are in same industry type, and have high product relevance and high probability of purchasing sequence, the strategy generating step S18 is performed to recommended a financial securities product 10 in the aforementioned industry type to the short-term investing customers, but the present disclosure is not limited thereto.

Please refer to FIG. 1, FIG. 2 and FIG. 3. FIG. 3 shows a block diagram of an analysis system 100 of a financial securities product value model based on artificial intelligence according to a third embodiment of the present disclosure. The analysis system 100 of the financial securities product value model based on artificial intelligence is configured to predict a purchasing strategy of a customer while the customer purchases a plurality of financial securities products 10. The analysis system 100 of the financial securities product value model based on artificial intelligence includes a processor 110 and a cloud server 120. The cloud server 120 includes a plurality of long-term trading parameters 121 and a short-term trading data 122 of each of the financial securities products 10. The processor 110 is signally connected to the cloud server 120, and configured to perform the analysis methods S10, S20 of the financial securities product value model based on artificial intelligence. Moreover, the processor 110 can be a central processing unit (CPU), a virtual private server (VPS) or other electrical computing device, and the cloud server 120 can be a memory or other data storing device, but the present disclosure is not limited thereto.

Figure 4:
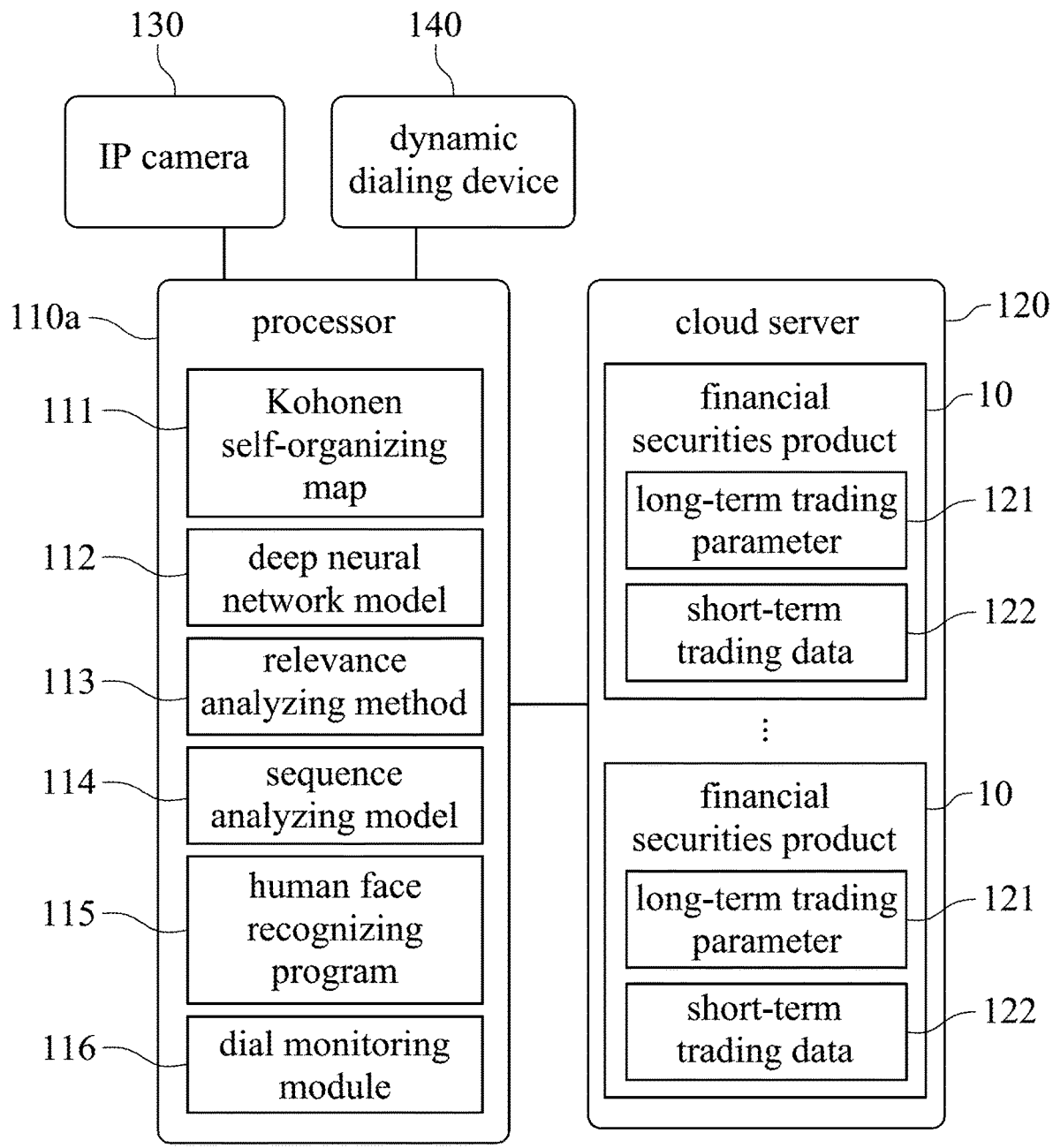
FIG. 4 shows a block diagram of an analysis system of a financial securities product value model based on artificial intelligence according to a fourth embodiment of the present disclosure.
Figure 5:
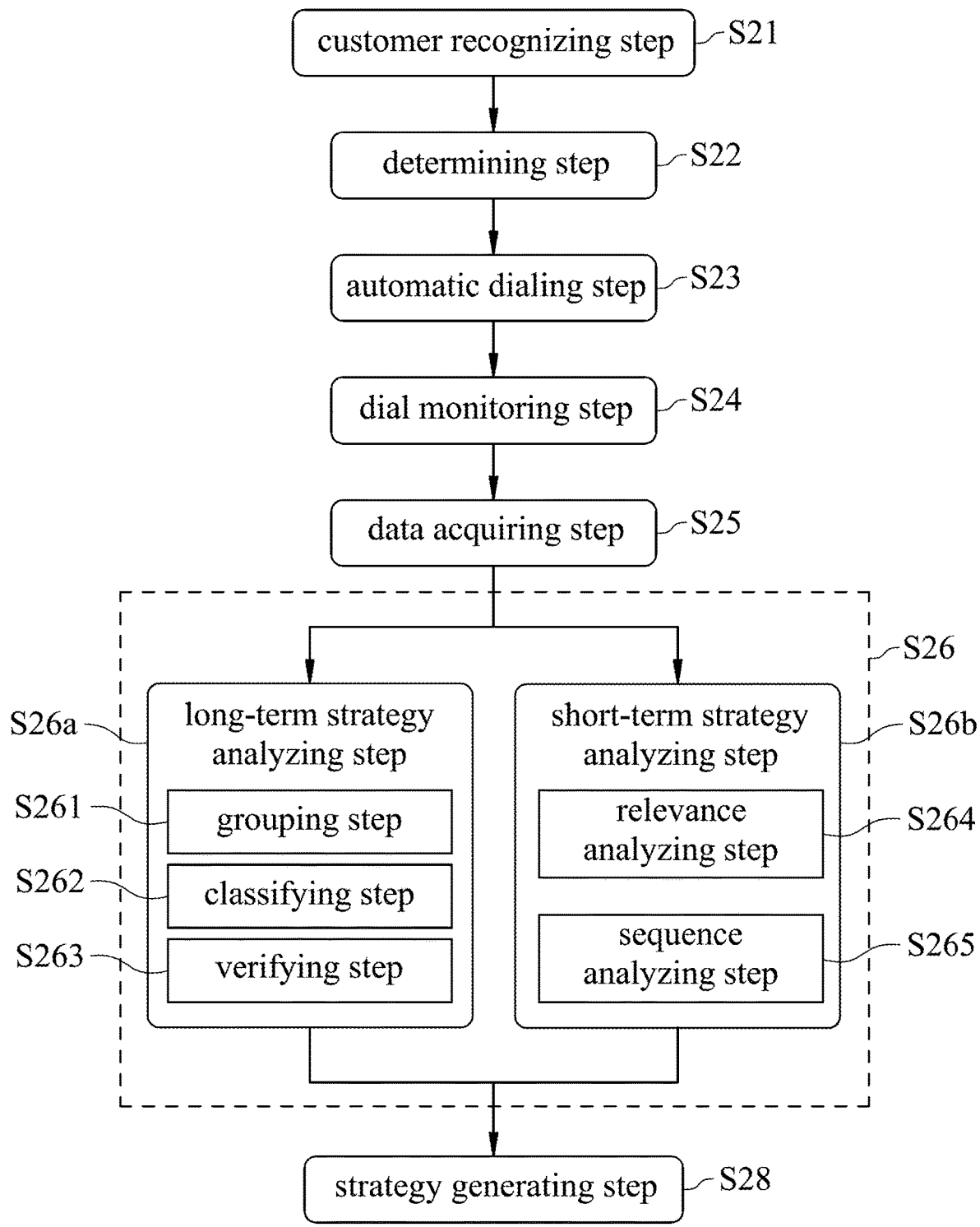
FIG. 5 shows a flow chart of an analysis method of a financial securities product value model based on artificial intelligence according to a fifth embodiment of the present disclosure.

Please refer to FIG. 4 and FIG. 5. FIG. 4 shows a block diagram of an analysis system 100*a* of a financial securities product value model based on artificial intelligence according to a fourth embodiment of the present disclosure. FIG. 5 shows a flow chart of an analysis method S30 of a financial securities product value model based on artificial intelligence according to a fifth embodiment of the present disclosure. The analysis system 100*a* of the financial securities product value model based on artificial intelligence includes a processor 110*a* and a cloud server 120. In the fourth embodiment, the cloud server 120 of the analysis system 100*a* of the financial securities product value model based on artificial intelligence is the same as the cloud server 120 of the analysis system 100 of the financial securities product value model based on artificial intelligence, and will not be described again herein. Furthermore, the analysis system 100*a* of the financial securities product value model based on artificial intelligence can further include an internet protocol (IP) camera 130 and a dynamic dialing device 140. The processor 110*a* can include a dial monitoring module 116. The processor 110*a* is configured to perform the analysis method S30 of the financial securities product value model based on artificial intelligence.

The analysis method S30 of the financial securities product value model based on artificial intelligence includes a determining step S22, a data acquiring step S25, an analyzing step S26 and a strategy generating step S28. The analyzing step S26 includes a long-term strategy analyzing step S26*a* and a short-term strategy analyzing step S26*b*. The long-term strategy analyzing step S26*a* can include a grouping step S261, a classifying step S262 and a verifying step S263. The short-term strategy analyzing step S26*b* can include a relevance analyzing step S264 and a sequence analyzing step S265. According to the fifth embodiment, each of the determining step S22, the data acquiring step S25, the analyzing step S26, the strategy generating step S28, the long-term strategy analyzing step S26*a*, the short-term strategy analyzing step S26*b*, the grouping step S261, the classifying step S262, the verifying step S263, the relevance analyzing step S264 and the sequence analyzing step S265 of the analysis method S30 of the financial securities product value model based on artificial intelligence are the same as the determining step S12, the data acquiring step S14, the analyzing step S16, the strategy generating step S18, the long-term strategy analyzing step S16*a*, the short-term strategy analyzing step S16*b*, the grouping step S161, the classifying step S162, the verifying step S163, the relevance analyzing step S164 and the sequence analyzing step S165 of the analysis method S20 of the financial securities product value model based on artificial intelligence, and will not be described again herein. Moreover, the analysis method S30 of the financial securities product value model based on artificial intelligence can further include a customer recognizing step S21, an automatic dialing step S23 and a dial monitoring step S24. The customer recognizing step S21 is performed before the determining step S22, and the automatic dialing step S23 and the dial monitoring step S24 are performed before the data acquiring step S25.

The IP camera 130 is signally connected to the processor 110*a*. The IP camera 130 is configured to capture a face image of the customer. The analysis method S30 of the financial securities product value model based on artificial intelligence further includes performing the customer recognizing step S21. The customer recognizing step S21 includes configuring the IP camera 130 to capture the face image of the customer, and recognize the face image of the customer according to a human face recognizing program 115. Moreover, in the customer recognizing step S21, after the IP camera 130 is configured to capture the face image of the customer, the processor 110*a* is configured to capture an feature value from the face image via an artificial intelligence algorithm, and the feature value of the face image is compared with feature values of other face images record in the cloud server 120 to identify the customer.

The dynamic dialing device 140 is signally connected to the processor 110*a*, and is configured to perform the automatic dialing step S23. The automatic dialing step S23 includes configuring the dynamic dialing device 140 to acquire an IP address to signally connect the processor 110*a* to the cloud server 120.

The dial monitoring step S24 includes configuring the dial monitoring module 116 of the processor 110*a* to monitor whether the dynamic dialing device 140 dials and signally connects to the cloud server 120 or not, in response to determining that the dynamic dialing device 140 not dials and signally connects to the cloud server 120, the dial monitoring module 116 configures the dynamic dialing device 140 to acquire another IP address to signally connect to the cloud server 120.

In the data acquiring step S25, a web crawler program is configured by the processor 110*a* to acquire the long-term trading parameters 121 and the short-term trading data 122 of the financial securities products 10 in the cloud server 120. However, when the web crawler program acquires data from the cloud server 120 via a same IP address repeatedly, the cloud server 120 may block the aforementioned IP address to connect to the cloud server. Thus, the dial monitoring module 116 of the analysis system 100*a* of the financial securities product value model based on artificial intelligence can monitor a dialing state of the dynamic dialing device 140 continuously, and configure the dynamic dialing device 140 to generate another IP address and dial via the another IP address when the dynamic dialing device 140 is fail to dial.

Therefore, the dial monitoring module 116 of the analysis system 100*a* of the financial securities product value model based on artificial intelligence of the present disclosure makes sure the processor 110*a* can acquire the long-term trading parameters 121 and the short-term trading data 122 corresponding to the financial securities products 10 from the cloud server 120 stably and analyzes the purchasing strategies.

A computer readable recording medium includes a program for the processor 110 capable of predicting the purchasing strategy of a customer while the customer purchases a plurality of financial products, to execute the analysis methods S10, S20 and S30 of the financial securities product value model based on artificial intelligence. The computer readable recording medium can be a CR-ROM, a flexible disk (FD), a CD-R, a digital versatile disk (DVD), a USB medium and a flash memory, but the present disclosure is not limited thereto.

According to the aforementioned embodiments and examples, the advantages of the present disclosure are described as follows.

1. The analysis method of the financial securities product value model based on artificial intelligence of the present disclosure can provide purchasing strategies corresponding to different customers by collecting the transaction detail according to whether the investing characteristic of each of the customer is long-term investing or short-term investing.

2. The analysis method of the financial securities product value model based on artificial intelligence of the present disclosure clusters the financial securities products into the groups according to the long-term trading parameters of the financial securities products, thereby providing a specific purchasing strategy to a specific customer by the investing characteristic thereof.

3. The dial monitoring module of the analysis system of the financial securities product value model based on artificial intelligence makes sure the processor can acquire the long-term trading parameters and the short-term trading data corresponding to the financial securities products from the cloud server stably and analyzes the purchasing strategies.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An analysis method of a financial securities product value model based on artificial intelligence, which is configured to predict a purchasing strategy of a customer while the customer purchases a plurality of financial securities products, and the analysis method of the financial securities product value model based on artificial intelligence comprising:

performing a determining step, wherein the determining step comprises configuring a processor to determine that the customer is one of a long-term investing customer and a short-term investing customer;

performing a data acquiring step, wherein the data acquiring step comprises configuring a web crawler program of the processor to acquire one of a plurality of long-term trading parameters and a short-term trading data of each of the financial securities products from a cloud server via an Internet Protocol (IP) address according to the one of the long-term investing customer and the short-term investing customer, the long-term trading parameters and the short-term trading data are corresponding to the long-term investing customer and the short-term investing customer, respectively;

performing an analyzing step, wherein the analyzing step comprises performing one of a long-term strategy analyzing step and a short-term strategy analyzing step according to the one of the long-term investing customer and the short-term investing customer;

wherein the long-term strategy analyzing step is performed to configure the processor to divide the financial securities products into a plurality of groups, and calculate a plurality of classify conditions corresponding to the groups and an importance value of each of the long-term trading parameters; and wherein the short-term strategy analyzing step is performed to configure the processor to analyze a product relevance and a purchasing sequence of the financial securities products;

performing a strategy generating step, wherein the strategy generating step comprises configuring the processor to generate the purchasing strategy according to the groups, the classify conditions, the importance value of each of the long-term trading parameters, the product relevance and the purchasing sequence;

performing an automatic dialing step, wherein the automatic dialing step comprises configuring a dynamic dialing device to acquire the IP address to signally connect the processor to the cloud server; and performing a dial monitoring step, wherein the dial monitoring step comprises configuring a dial monitoring module of the processor to monitor whether the dynamic dialing device dials and signally connects to the cloud server or not, wherein in response to determining that the dynamic dialing device does not dial and signally connect to the cloud server, the dial monitoring module configures the dynamic dialing device to acquire another IP address to signally connect to the cloud server;

wherein the dynamic dialing device is configured to dial via the another IP address when the dynamic dialing device fails to dial by the IP address;

wherein in response to determining that the customer is determined as the long-term investing customer, the processor is configured to perform the long-term strategy analyzing step;

wherein in response to determining that the customer is determined as the short-term investing customer, the processor is configured to perform the short-term strategy analyzing step.

2. The analysis method of the financial securities product value model based on artificial intelligence of claim 1, wherein the long-term trading parameters comprise a beta factor, a debt/equity ratio, a return on equity, a price-book ratio, a revenue growth rate, a market value, a turnover rate, a trading volume, a stock price and a momentum.

3. The analysis method of the financial securities product value model based on artificial intelligence of claim 1, wherein the long-term strategy analyzing step comprises:

performing a grouping step, wherein the grouping step comprises configuring the processor to divide the financial securities products into the groups according to a Kohonen self-organizing map, the groups comprise a high return rate group, a medium return rate group and a low return rate group;

performing a classifying step, wherein the classifying step comprises configuring the processor to classify the high return rate group, the medium return rate group and the low return rate group to generate the classify conditions according to the long-term trading parameters of the financial securities products; and performing a verifying step, wherein the verifying step comprises configuring the processor to verify the importance value of each of the long-term trading parameters according to a deep neural network model.

4. The analysis method of the financial securities product value model based on artificial intelligence of claim 1, wherein the short-term strategy analyzing step comprises:
performing a relevance analyzing step, wherein the relevance analyzing step comprises configuring the processor to analyze the product relevance of the financial securities products according to a relevance analyzing method; and
performing a sequence analyzing step, wherein the sequence analyzing step comprises configuring the processor to analyze the purchasing sequence of the financial securities products according to a sequence analyzing model.

5. The analysis method of the financial securities product value model based on artificial intelligence of claim 1, further comprising:
performing a customer recognizing step, wherein the customer recognizing step comprises configuring an IP camera to capture a face image of the customer, and recognize the face image of the customer according to a human face recognizing program;
wherein the customer recognizing step is performed before the determining step, the automatic dialing step and the dial monitoring step are performed before the data acquiring step, the dynamic dialing device is signally connected to the processor, and the IP camera is signally connected to the processor.

6. An analysis system of a financial securities product value model based on artificial intelligence, which is configured to predict a purchasing strategy of a customer while the customer purchases a plurality of financial securities products, and the analysis system of the financial securities product value model based on artificial intelligence comprising:
a cloud server comprising a plurality of long-term trading parameters and a short-term trading data of each of the financial securities products;
a processor signally connected to the cloud server, and configured to perform an analysis method of the financial securities product value model based on artificial intelligence comprising:
performing a determining step, wherein the determining step comprises determining that the customer is one of a long-term investing customer and a short-term investing customer;
performing a data acquiring step, wherein the data acquiring step comprises configuring a web crawler program of the processor to acquire one of the long-term trading parameters and the short-term trading data of each of the financial securities products from the cloud server via an IP address according to the one of the long-term investing customer and the short-term investing customer, wherein the long-term trading parameters and the short-term trading data are corresponding to the long-term investing customer and the short-term investing customer, respectively;
performing an analyzing step, wherein the analyzing step comprises performing one of a long-term strategy analyzing step and a short-term strategy analyzing step according to the one of the long-term investing customer and the short-term investing customer;
wherein the long-term strategy analyzing step is performed to divide the financial securities products into a plurality of groups, and calculate a plurality of classify conditions corresponding to the groups and an importance value of each of the long-term trading parameters; and
wherein the short-term strategy analyzing step is performed to analyze a product relevance and a purchasing sequence of the financial securities products; and
performing a strategy generating step, wherein the strategy generating step comprises generating the purchasing strategy according to the groups, the classify conditions, the importance value of each of the long-term trading parameters, the product relevance and the purchasing sequence; and
a dynamic dialing device signally connected to the processor, and configured to acquire the IP address to signally connect the processor to the cloud server;
wherein in response to determining that the customer is determined as the long-term investing customer, the processor is configured to perform the long-term strategy analyzing step;
wherein in response to determining that the customer is determined as the short-term investing customer, the processor is configured to perform the short-term strategy analyzing step;
wherein the processor comprises:
a dial monitoring module configured to monitor whether the dynamic dialing device dials and signally connects to the cloud server or not, wherein in response to determining that the dynamic dialing device does not dial and signally connect to the cloud server, the dial monitoring module configures the dynamic dialing device to acquire another IP address to signally connect to the cloud server;
wherein the dynamic dialing device is configured to dial via the another IP address when the dynamic dialing device fails to dial by the IP address.

7. The analysis system of the financial securities product value model based on artificial intelligence of claim 6, wherein the long-term trading parameters comprise a beta factor, a debt/equity ratio, a return on equity, a price-book ratio, a revenue growth rate, a market value, a turnover rate, a trading volume, a stock price and a momentum, and the long-term strategy analyzing step comprises:
performing a grouping step, wherein the grouping step comprises dividing the financial securities products into the groups according to a Kohonen self-organizing map, the groups comprise a high return rate group, a medium return rate group and a low return rate group;
performing a classifying step, wherein the classifying step comprises classifying the high return rate group, the medium return rate group and the low return rate group to generate the classify conditions according to the long-term trading parameters of the financial securities products; and
performing a verifying step, wherein the verifying step comprises verifying the importance value of each of the long-term trading parameters according to a deep neural network model.

8. The analysis system of the financial securities product value model based on artificial intelligence of claim 6, wherein the short-term strategy analyzing step comprises:
performing a relevance analyzing step, wherein the relevance analyzing step comprises analyzing the product relevance of the financial securities products according to a relevance analyzing method; and performing a sequence analyzing step, wherein the sequence analyzing step comprises analyzing the purchasing sequence of the financial securities products according to a sequence analyzing model.

9. The analysis system of the financial securities product value model based on artificial intelligence of claim 6, further comprising:
   an IP camera signally connected to the processor, and configured to capture a face image of the customer;
   wherein the analysis method of the financial securities product value model based on artificial intelligence further comprises:
      performing a customer recognizing step, wherein the customer recognizing step comprises capturing the face image of the customer, and recognize the face image of the customer according to a human face recognizing program;
   wherein the customer recognizing step is performed before the determining step.

10. A non-transitory computer readable recording medium storing a program for a processor capable of predicting a purchasing strategy of a customer while the customer purchases a plurality of financial securities products, to execute an analysis method of a financial securities product value model based on artificial intelligence comprising:
   performing a determining step, wherein the determining step comprises configuring the processor to determine that the customer is one of a long-term investing customer and a short-term investing customer;
   performing a data acquiring step, wherein the data acquiring step comprises configuring a web crawler program of the processor to acquire one of a plurality of long-term trading parameters and a short-term trading data of each of the financial securities products from a cloud server via an IP address according to the one of the long-term investing customer and the short-term investing customer, the long-term trading parameters and the short-term trading data are corresponding to the long-term investing customer and the short-term investing customer, respectively;
   performing an analyzing step, wherein the analyzing step comprises performing one of a long-term strategy analyzing step and a short-term strategy analyzing step according to the one of the long-term investing customer and the short-term investing customer;
      wherein the long-term strategy analyzing step is performed to configure the processor to divide the financial securities products into a plurality of groups, and calculate a plurality of classify conditions corresponding to the groups and an importance value of each of the long-term trading parameters; and
      wherein the short-term strategy analyzing step is performed to configure the processor to analyze a product relevance and a purchasing sequence of the financial securities products;
   performing a strategy generating step, wherein the strategy generating step comprises configuring the processor to generate the purchasing strategy according to the groups, the classify conditions, the importance value of each of the long-term trading parameters, the product relevance and the purchasing sequence;
   performing an automatic dialing step, wherein the automatic dialing step comprises configuring a dynamic dialing device to acquire the IP address to signally connect the processor to the cloud server; and
   performing a dial monitoring step, wherein the dial monitoring step comprises configuring a dial monitoring module of the processor to monitor whether the dynamic dialing device dials and signally connects to the cloud server or not, wherein in response to determining that the dynamic dialing device does not dial and signally connect to the cloud server, the dial monitoring module configures the dynamic dialing device to acquire another IP address to signally connect to the cloud server;
   wherein the dynamic dialing device is configured to dial via the another IP address when the dynamic dialing device fails to dial by the IP address;
   wherein in response to determining that the customer is determined as the long-term investing customer, the processor is configured to perform the long-term strategy analyzing step;
   wherein in response to determining that the customer is determined as the short-term investing customer, the processor is configured to perform the short-term strategy analyzing step.

* * * * *